Feb. 19, 1935. K. L. RICK Re. 19,473

BRACKET

Original Filed June 29, 1928

Inventor
Karl L. Rick,
By Atkinson, Hurley, Byron & Knight
Attys.

Reissued Feb. 19, 1935

Re. 19,473

UNITED STATES PATENT OFFICE 19,473

BRACKET

Karl L. Rick, Chicago, Ill., assignor to Joslyn Manufacturing and Supply Company, Chicago, Ill., a corporation of Illinois Original No. 1,839,594, dated January 5, 1932, Serial No. 289,239, June 29, 1928. Application for reissue July 26, 1933, Serial No. 682,306

9 Claims. (Cl. 173—321)

The invention pertains to insulators and brackets for supporting the same and more particularly to bracket carrying insulators adapted for use with overhead power systems.

Heretofore it has been the practice to mount insulators upon a vertical pin screwed to or carried by a suitable buck arm or cross arm upon the upper end of a pole or support. However, this structure is not dependable, especially where employed at the dead end of a wire, for the reason that there is considerable pull in one direction only upon the pin, causing it to either snap, or split the cross arm and eventually become dismantled.

It is, therefore, an object of this invention to provide a structure which will eliminate the necessity for mounting an insulator pin upon a cross arm without further support.

Another object is to provide a construction whereby the insulator may be readily adapted to cross arms without the necessity of having to bore the latter to fit insulator pins therein.

Still another object is to provide a structure which is efficient, cheap to manufacture and maintain, can be built substantially of structural shapes and one which fulfills all requirements of service and manufacture.

With these and various other objects in view, the invention may consist of certain novel features of construction and operation, as will be more fully described and particularly pointed out in the specification, drawing and claims appended hereto.

In the drawing which illustrates an embodiment of the device, and wherein like reference characters are used to designate like parts—

Figure 1:
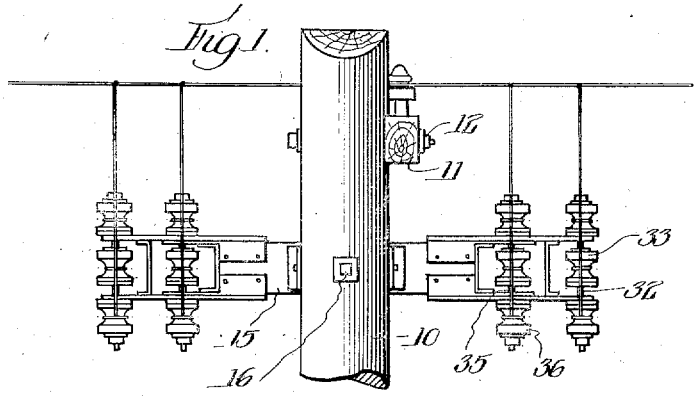
Figure 1 is a fragmentary side elevation of the upper end of a pole or support showing the brackets as applied thereto and associated with an overhead power system.
Figure 2:
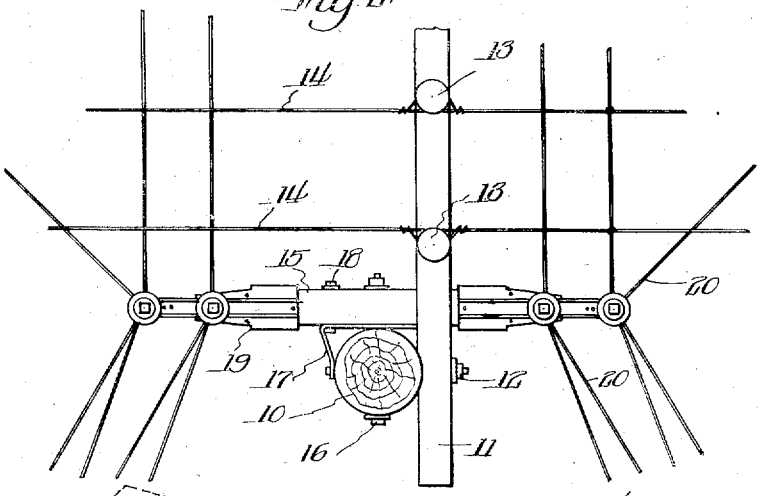
Figure 2 is a top plan view of the structure illustrated in Figure 1.
Figure 3:
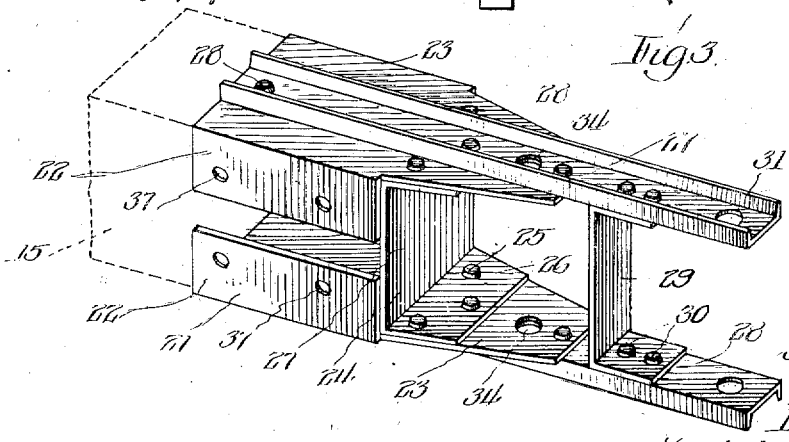
Figure 3 is an enlarged perspective view of the bracket device which is the subject matter of the invention.

In the construction illustrated the pole or support 10 has the side arm or support 11 secured thereto as by the nut and bolt connection 12, said side arm being provided with spaced insulators 13 carrying the phase conduits 14. The pole 10 is also provided with a buck arm 15 located at a convenient distance below the side arm and secured thereto by means of the bolt and nut connection 16 and the bracket 17 described and claimed in co-pending application, Serial No. 289,185, filed June 28, 1928, said bracket being secured to the side arm by means of the nut and bolt connections 18.

Brackets 19 which are the subject matter of this invention are shown as applied to both ends of the buck arm 15, said brackets being provided with suitable means, to be later described, for carrying the supply conduits 20 associated in the usual manner with the phase conduits 14.

Referring particularly to the bracket 19, the same may consist essentially of socket forming members 21 substantially channel shaped, disposed so that the flanges 22 toe toward each other, a portion of said flanges being cut away and the web 23 therebetween tapered, the said tapered portion forming a base for the attachment of the spacing channel 24 secured thereto as by rivets 25, the flanges 26 thereof toeing away from the socket and the web 27 thereof serving to complete the socket. The webs 23 of the members 21 have channel shaped members 27 secured thereto as by rivets 28, the flanges of said channel members toeing away from the channel members 21, said members being spaced apart by the channel support 29 secured thereto as by the rivets 30.

Aligned apertures 31 are provided in the web of the channel 27 to accommodate a supporting pin 32 securing the insulators 33 to the bracket structure. On the opposite side of the spacer 29 there are provided aligned apertures 34 disposed through the webs of the channel members 27 and 21, and provide a means for securing the supporting pin 35 thereto, said pin serving to secure the insulators 36 in operative position.

It will be understood that any number of rows of insulators may be provided, it being only necessary to provide an elongated member 27, each row being preferably separated by a brace 29.

It will be seen with the construction shown that structural shapes may be employed for the various parts, so that a very inexpensive yet effective construction may be had, and in the application of the device to the buck arm, it is only necessary to slip the socket portion on said buck arm, securing the same by any means, such as nut and bolt connections, disposed through aligned apertures 37 disposed in the flanges of the members 21, and through corresponding apertures in the buck arm.

It is to be understood that I do not wish to be limited by the exact embodiment of the device shown, which is merely by way of illustration and not limitation, as various and other forms of the device will, of course, be apparent to those skilled in the art, without departing from the spirit of the invention or the scope of the claims.

I claim:

1. In a bracket the combination of a socket forming portion adapted for engagement with a support, said socket forming portion including facing substantially channel shaped members and a channel shaped spacing member secured thereto, and spaced insulator carrying members, each being joined to one of said facing channel shaped members and being secured to said spacing channel shaped member, and spacing means secured to said insulator carrying members.

2. In a bracket the combination of a socket forming portion adapted for engagement with a support, said socket forming portion including facing substantially channel shaped members for the length of said socket, said members having a flat portion providing securing means for a channel shaped spacing member secured thereto to complete said socket portion and spaced insulator carrying members, each of said latter members being joined to one of said facing channel shaped members and being secured to said second named channel shaped member.

3. In a bracket, the combination of a socket forming portion adapted for engagement with a support, said socket forming portion including facing substantially channel shaped members for the length of said socket, said members having a flat portion providing securing means for a channel shaped spacing member secured thereto to complete said socket portion and spaced insulator carrying members, each of said latter members being joined to one of said facing channel shaped members and being secured to said spacing channel shaped member, said flat portions and said insulator carrying members having aligned apertures for insulator securing means.

4. In a bracket the combination of a socket forming portion adapted for engagement with a support, said socket forming portion including facing substantially channel shaped members for the length of said socket, said members having a flat portion providing securing means for a channel shaped spacing member secured thereto to complete said socket portion, and spaced channel shaped insulator carrying members, each being joined to one of said facing channel shaped members and being secured to said spacing channel shaped member, said flat portions and said insulator carrying members having aligned apertures for insulator securing means, and spacing means secured to said insulator carrying member between each insulator carried thereby.

5. In combination for use with a pole having a transverse cross arm supporting a longitudinal run of power supply conductors, a buck arm adapted to be mounted on the pole below the cross arm for supporting a plurality of service drop wires to distribute service to a plurality of customers adjacent the pole, said buck arm comprising a short wooden arm secured to the pole and extending substantially longitudinally of the run of power conductors and being adapted to support a plurality of wires extending substantially transversely to the run of the power supply conductors, said buck arm having metallic brackets forming longitudinal extensions of each end, and each bracket comprising an attaching part for gripping the end of the buck arm, and a pair of parallel bars extending horizontally from the top and bottom of the attaching portion, insulator supporting bolts extending vertically through said arms, a plurality of spool insulators strung on said bolts, said service wires being supported on said insulators and connected to said power supply conductors, and connections between the arms of the brackets between said insulator supporting bolts to brace said arms of each bracket against each other.

6. As an article of manufacture, a bracket for supporting an insulator beyond the end of a cross arm, comprising two substantially parallel horizontally extending plates adapted to extend longitudinally along the top and bottom of the end of the cross arm and extend therebeyond, means connected to said plates for clamping the plates upon the end of the cross arm, said means being provided with transverse bolt holes for receiving a bolt extending through the end of the cross arm; the free ends of the plates having vertically aligned holes for receiving a bolt, an insulator supporting bolt through said holes, an insulator on said bolt between said plates, said plates having vertically extending stiffening flanges, and a brace disposed between said plates at a point intermediate said means and said aligned holes to brace the plates against each other.

7. As an article of manufacture, an insulator bracket for forming an endwise extension of a cross arm to which it is adapted to be atached, comprising two substantially parallel horizontally extending plates adapted to project endwise from the top and bottom respectively of the end of the cross arm, clamping means cooperating with said plates and adapted to embrace opposite sides of the end of the cross arm and having horizontally aligned bolt holes for bolting the bracket to the end of the cross arm, the projecting ends of the plates having vertically aligned holes for receiving a bolt, an insulator supporting bolt adapted to extend through said latter holes, said plates having vertically extending stiffening flanges, and a brace disposed between said plates at a point remote from the clamping means for bracing the plates against each other.

8. As an article of manufacture, a metallic bracket for supporting a spool insulator upon a cross-arm beyond the end of the cross-arm, comprising an attaching portion having means adapted to extend longitudinally along and rest against the surfaces of the cross-arm at the end thereof, said means engaging a horizontal side and a vertical side of the end of the cross-arm, said means having bolt holes to receive bolts for clamping said attaching portion to the end of the cross-arm, said bracket comprising further a pair of substantially parallel horizontally disposed plate-like arms extending from the top and bottom of the attaching portion longitudinally thereof and adapted to extend endwise from the end of the cross-arm, said arms being spaced apart to receive a vertically disposed spool insulator between them, said arms having vertically aligned holes for receiving an insulator supporting pin, and a vertically disposed brace between said plate-like arms for mutually bracing said arms, said brace being disposed between said attaching portion of the bracket and the outer ends of said arms.

9. The bracket as recited in claim 8 wherein each horizontal plate-like arm has a vertically extending strengthening flange.

KARL L. RICK.